US012761921B2

(12) United States Patent
Wang et al.

(10) Patent No.: US 12,761,921 B2
(45) Date of Patent: Oct. 13, 2026

(54) INSTRUCTION FLAGGING CIRCUIT CONFIGURED TO PERFORM INSTRUCTION DETECTION AND SET INSTRUCTION FLAGS FOR CONDITIONAL BRANCH INSTRUCTIONS

(71) Applicants: Xian ESWIN Computing Technology Co., Ltd., Xi'an (CN); Beijing ESWIN Computing Technology Co., Ltd., Beijing (CN)

(72) Inventors: Chao Wang, Xi'an (CN); Kunpeng Zhao, Xi'an (CN); Xiansheng Yin, Xi'an (CN)

(73) Assignees: Xian ESWIN Computing Technology Co., Ltd., Xi'an (CN); Beijing ESWIN Computing Technology Co., Ltd., Beijing (CN)

( * ) Notice: Subject to any disclaimer, the term of this patent is extended or adjusted under 35 U.S.C. 154(b) by 88 days.

(21) Appl. No.: 18/959,077

(22) Filed: Nov. 25, 2024

(65) Prior Publication Data

US 2025/0328348 A1 Oct. 23, 2025

(30) Foreign Application Priority Data

Apr. 18, 2024 (CN) ........................ 202410471560.9

(51) Int. Cl.
*G06F 9/30* (2018.01)
*G06F 9/38* (2018.01)

(52) U.S. Cl.
CPC ........ *G06F 9/3844* (2013.01); *G06F 9/30058* (2013.01); *G06F 9/3865* (2013.01)

(58) Field of Classification Search
CPC .. G06F 9/3846; G06F 9/30058; G06F 9/3842; G06F 9/3861; G06F 9/3865
See application file for complete search history.

(56) References Cited

U.S. PATENT DOCUMENTS 6,260,138 B1 * 7/2001 Harris .................. G06F 9/3844 712/237
6,289,442 B1 9/2001 Asato
(Continued)

FOREIGN PATENT DOCUMENTS

CN 102520913 A 6/2012
CN 104793921 A 7/2015
(Continued)

*Primary Examiner* — Courtney P Spann
(74) *Attorney, Agent, or Firm* — Syncoda LLC; Feng Ma

(57) ABSTRACT

An instruction flagging circuit includes: a first instruction detection sub-circuit for performing instruction detection on to-be-processed instructions to obtain a first detection result, wherein the first detection result includes a first conditional branch instruction and at least one non-jump instruction of the to-be-processed instructions, a jump range of the first conditional branch instruction is within a first range, and the non-jump instruction is to be executed when the first conditional branch instruction does not jump; and a first instruction flagging sub-circuit for setting, according to the first detection result, instruction flags for the first conditional branch instruction and the non-jump instruction to obtain target flagged instructions. The target flagged instructions indicate an instruction execution circuit to execute the non-jump instruction including the instruction flag when it is determined that the first conditional branch instruction jumps.

20 Claims, 5 Drawing Sheets

(56) References Cited

U.S. PATENT DOCUMENTS

| | | | | |
|---|---|---|---|---|
| 7,114,063 | B1 | 9/2006 | Fontaine | |
| 2002/0174328 | A1* | 11/2002 | Kruckemyer | G06F 9/3842 712/E9.05 |
| 2004/0064682 | A1 | 4/2004 | Nguyen | |
| 2005/0125634 | A1* | 6/2005 | Ishizuka | G06F 9/3861 712/E9.05 |
| 2006/0155976 | A1* | 7/2006 | Ito | G06F 9/3861 712/234 |
| 2006/0282829 | A1* | 12/2006 | McIlvaine | G06F 9/30072 712/E9.05 |
| 2007/0288734 | A1* | 12/2007 | Luick | G06F 9/3836 712/237 |
| 2024/0202002 | A1* | 6/2024 | Ido | G06F 9/3842 |

FOREIGN PATENT DOCUMENTS

| | | | |
|---|---|---|---|
| CN | 111258654 | A | 6/2020 |
| CN | 112230992 | A | 1/2021 |
| CN | 109614146 | B | 3/2021 |
| CN | 112540794 | A | 3/2021 |
| CN | 113254082 | A | 8/2021 |
| CN | 113760366 | A | 12/2021 |
| CN | 115827064 | A | 3/2023 |
| CN | 113760366 | B | 2/2024 |

* cited by examiner

| | | | | |
|---|---|---|---|---|
| 1st Beat | 1 | 2 | 3 | 4 |
| | Sfb | sfb_shadow | Sfb | sfb_shadow |
| 2nd Beat | 5 | 6 | 7 | 8 |
| | sfb_shadow | sfb_shadow | Sfb | sfb_shadow |
| 3rd Beat | 9 | 10 | 11 | 12 |
| | sfb_shadow | sfb_shadow | | |
FIG. 4
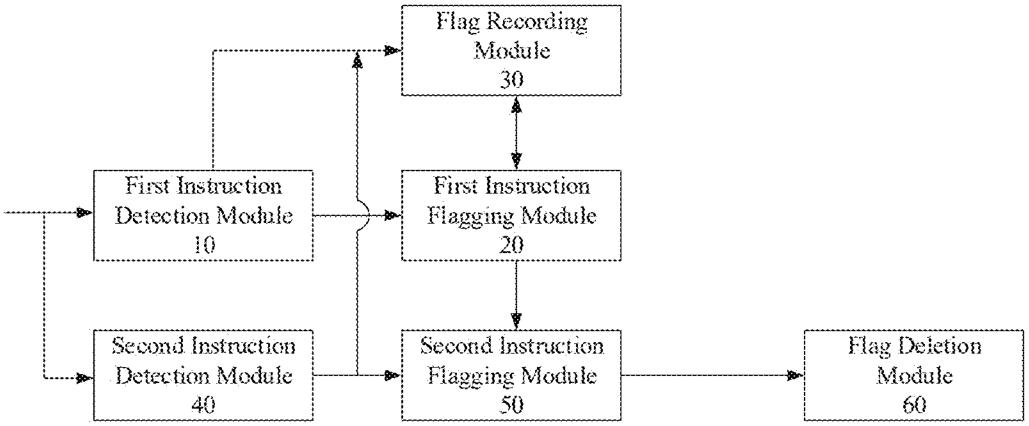
FIG. 5
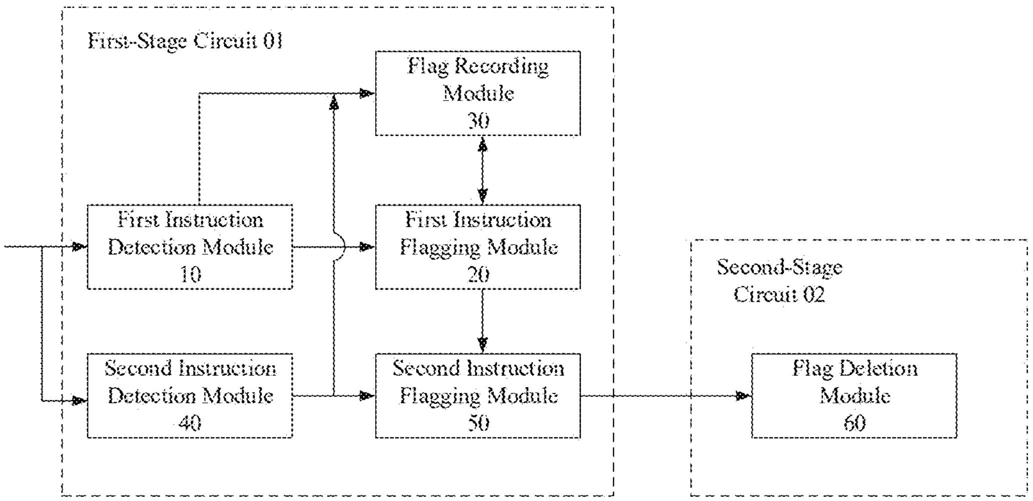
FIG. 6

INSTRUCTION FLAGGING CIRCUIT CONFIGURED TO PERFORM INSTRUCTION DETECTION AND SET INSTRUCTION FLAGS FOR CONDITIONAL BRANCH INSTRUCTIONS

CROSS-REFERENCE TO RELATED APPLICATION

This application claims priority to Chinese patent application No. 202410471560.9 filed on Apr. 18, 2024, the disclosure of which is hereby incorporated by reference in its entirety.

BACKGROUND

When a processor processes instructions, a pipeline is typically adopted to processes the instructions. When a part of instructions starts to be executed, subsequent predicted to-be-processed instructions have been taken out of the instruction register and entered the pipeline. However, when a predicted jump result of a conditional branch instruction is incorrect, the to-be-processed instructions entering the pipeline will not be executed. In such case, the processor needs to flush the pipeline to re-read correct to-be-processed instructions, which will cause degradation in the processing performance of the processor.

SUMMARY

Embodiments of the disclosure relates to the field of circuit technology, and provide an instruction flagging circuit, which can reduce the probability that a processor re-flushes a pipeline and thereby improve the processing efficiency of the processor.

The technical solutions of the disclosure are implemented as follows.

In a first aspect, there is provided a n instruction flagging circuit, including: a first instruction detection sub-circuit, configured to perform instruction detection on to-be-processed instructions to obtain a first detection result, wherein the first detection result includes: a first conditional branch instruction and at least one non-jump instruction of the to-be-processed instructions, wherein a jump range of the first conditional branch instruction is within a first range, and the at least one non-jump instruction is to be executed when the first conditional branch instruction does not jump; and a first instruction flagging sub-circuit, configured to set, according to the first detection result, instruction flags for the first conditional branch instruction and the at least one non-jump instruction of the to-be-processed instructions to obtain target flagged instructions, wherein the target flagged instructions are configured to indicate an instruction execution circuit to: execute the at least one non-jump instruction including the instruction flag in case that it is determined that the first conditional branch instruction jumps.

In a second aspect, there is provided A processor, including: an instruction flagging circuit and an instruction execution circuit, wherein the instruction flagging circuit includes: a first instruction detection sub-circuit, configured to perform instruction detection on to-be-processed instructions to obtain a first detection result, wherein the first detection result includes: a first conditional branch instruction and at least one non-jump instruction of the to-be-processed instructions, wherein a jump range of the first conditional branch instruction is within a first range, and the at least one non-jump instruction is to be executed when the first conditional branch instruction does not jump; and a first instruction flagging sub-circuit, configured to set, according to the first detection result, instruction flags for the first conditional branch instruction and the at least one non-jump instruction of the to-be-processed instructions to obtain target flagged instructions, wherein the target flagged instructions are configured to indicate an instruction execution circuit to: execute the at least one non-jump instruction including the instruction flag in case that it is determined that the first conditional branch instruction jumps, the instruction flagging circuit is configured to set the instruction flags for the first conditional branch instruction and the at least one non-jump instruction of the to-be-processed instructions to obtain the target flagged instructions; and the instruction execution circuit is configured to execute the target flagged instructions according to a jump situation of the first conditional branch instruction and the instruction flags of the target flagged instructions.

In a third aspect, there is provided an instruction flagging method, including: performing, by a first instruction detection sub-circuit, instruction detection on to-be-processed instructions to obtain a first detection result, wherein the first detection result includes: a first conditional branch instruction and at least one non-jump instruction of the to-be-processed instructions, wherein a jump range of the first conditional branch instruction is within a first range, and the at least one non-jump instruction is to be executed when the first conditional branch instruction does not jump; and setting, by a first instruction flagging sub-circuit, according to the first detection result, instruction flags for the first conditional branch instruction and the at least one non-jump instruction of the to-be-processed instructions to obtain target flagged instructions, wherein the target flagged instructions are configured to indicate an instruction execution circuit to: execute the at least one non-jump instruction including the instruction flag in case that it is determined that the first conditional branch instruction jumps.

BRIEF DESCRIPTION OF THE DRAWINGS

The drawings herein are incorporated into and form a part of the specification, which illustrate embodiments conforming to the disclosure and are used in combination with the specification to illustrate the technical solutions of the disclosure.

FIG. 4 is a schematic diagram of optional first flagged instructions in 3 consecutive beats provided by an embodiment of the disclosure.

FIG. 5 is a schematic diagram of a structure of an optional instruction flagging circuit provided by an embodiment of the disclosure.

FIG. 6 is a schematic diagram of a structure of an optional instruction flagging circuit provided by an embodiment of the disclosure.

DETAILED DESCRIPTION

Figure 1:
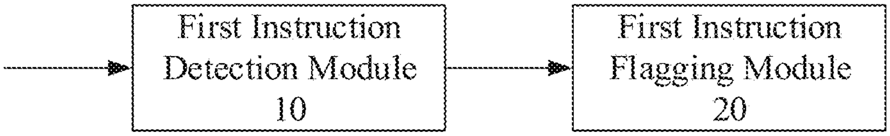
FIG. 1 is a schematic diagram of a structure of an optional instruction flagging circuit provided by an embodiment of the disclosure.

In order to make the purposes, technical solutions and advantages of the disclosure clearer, the disclosure will be described in further detail in the following in combination with the drawings. The described embodiments shall not be regarded as limitations of the disclosure, and all other embodiments obtained by a person of ordinary skill in the art without creative labor fall within the scope of protection of the disclosure.

In the following description, the term "some embodiments" referred to a subset of all possible embodiments, but it is to be understood that "some embodiments" may be the same or different subsets of all possible embodiments and may be combined with each other without conflict.

In the following description, the term "first/second/third" referred to is used only to differentiate between similar objects, and does not represent a particular order of the objects. It is to be understood that "first/second/third" may be interchanged for a particular order or precedence where permitted to enable the embodiments of the disclosure described herein to be implemented in an order other than that illustrated or described herein.

Unless otherwise defined, all technical and scientific terms used herein have the same meanings as commonly understood by those skilled in the art of the disclosure. The terms used herein are only for the purpose of describing the embodiments of the disclosure and are not intended to limit the disclosure.

When a processor processes instructions in a manner of pipeline, instruction fetch, instruction decoding, instruction execution, instruction memory access, and instruction write-back may be generally included. In this way, while the processor is executing the instructions, a part of subsequent to-be-executed instructions have already been read from the memory and a part of instructions have already begun to be decoded. Since to-be-executed instructions following a conditional branch instruction may vary depending on whether the conditional branch instruction jumps, when it is needed to process a conditional branch instruction, the processor generally needs to predict whether the conditional branch instruction jumps, and the processor takes, according to the prediction result, instructions matching the prediction result out from the memory as the to-be-executed instructions. In this way, in case that the prediction result of the conditional branch instruction is incorrect, the to-be-executed instructions that have been read from the memory include instructions that do not need to be executed. The processor needs to flush the pipeline and re-read correct to-be-processed instructions from the memory, which will affect the processing efficiency of the processor and cause degradation in the performance.

In view of the above, an embodiment of the disclosure provides an instruction flagging circuit, which may flag to-be-executed instructions following a conditional branch instruction, such that the processor may execute instructions with flags matching the jump direction of the conditional branch instruction, which reduces the probability that the processer flushes the pipeline and thereby improves the processing efficiency of the processor. The instruction flagging circuit provided by the embodiment of the disclosure may be disposed in any electronic device including a processor, for example, a device that requires a processor to execute instructions, such as a server, a laptop computer, a tablet computer, a desktop computer, a smart TV, a mobile device (e.g., a mobile phone, a portable video player, a personal digital assistant, a specialized message device or a portable game device).

FIG. 1 illustrates a structure of an optional instruction flagging circuit. As illustrated in FIG. 1, the circuit includes a first instruction detection module 10 and a first instruction flagging module 20. The first instruction detection module 10 is configured to perform instruction detection on to-be-processed instructions to obtain a first detection result. The first detection result includes a first conditional branch instruction and at least one non-jump instruction of the to-be-processed instructions. A jump range of the first conditional branch instruction is within a first range, and the at least one non-jump instruction is to be executed when the first conditional branch instruction does not jump. The first instruction flagging module 20 is configured to set, according to the first detection result, instruction flags for the first conditional branch instruction and the at least one non-jump instruction of the to-be-processed instructions to obtain target flagged instructions. The target flagged instructions are configured to indicate an instruction execution circuit to execute the at least one non-jump instruction including the instruction flag in case that it is determined that the first conditional branch instruction jumps.

In the embodiments of the disclosure, the to-be-processed instructions include the first conditional branch instruction, a jump instruction to be executed when the first conditional branch instruction jumps and the non-jump instruction to be executed when the first conditional branch instruction does not jump. Here, the first instruction detection module 10 may read the to-be-processed instructions from the instruction memory in real time, or may read the to-be-processed instructions at every reading interval, or may read the to-be-processed instructions in beats according to the amount of read data, or may read the to-be-processed instructions in beats according to the number of read instructions. The reading interval, the amount of read data and the number of read instructions may be set as demanded, which is not limited in the embodiments of the disclosure.

In the embodiments of the disclosure, after acquiring the to-be-processed instructions, the first instruction detection module 10 may perform the instruction detection on the to-be-processed instructions to obtain instruction information, and determine the first detection result according to the instruction information. The instruction information includes whether a to-be-processed instruction is a conditional branch instruction and a jump range, and so on. In this way, the first instruction detection module 10 may determine, according to the jump range of the conditional branch instruction, a jump direction and a target instruction to which the conditional branch instruction jumps. In case that the jump direction is forward, i.e., the target instruction is after the conditional branch instruction and the jump range is within the first range, the conditional branch instruction may be determined as the first conditional branch instruction.

In some embodiments, the to-be-processed instruction includes multiple beats, and each beat has the same number of to-be-processed instructions. The first range may represent a range of the current beat, a range of two consecutive beats, a preset number of instructions, or the like, which may be set according to actual needs and is not limited in the embodiments of the disclosure.

Exemplarily, the first range is 10. If the 2nd to-be-processed instruction is a conditional branch instruction and the jump range is 5, the 2nd to-be-processed instruction is the first conditional branch instruction. If the 2nd to-be-processed instruction is a conditional branch instruction and the jump range is 12, the 2nd to-be-processed instruction is not the first conditional branch instruction.

In the embodiments of the disclosure, the instruction code of the to-be-processed instruction usually includes a main operation code (opcode), a function code, a source operand register 1, a source operand register 2, and a jump range. The function code is used to represent the type of the instruction code, and the conditional branch instruction is one of the types. The number of bits of the function code may be 3 bits, i.e., the funct3 field, or the number of bits of the function code may be 7 bits, i.e., the funct7 field, and so on, which may be set as demanded and is not limited in the embodiments of the disclosure. The comparison result of the values of the source operand register 1 and the source operand register 2 determines whether the conditional branch instruction jumps.

In the embodiments of the disclosure, the first instruction detection module 10 may detect the main operation code, the function code and the jump range of the to-be-processed instruction, and determine the first conditional branch instruction from the to-be-processed instructions. The first instruction detection module 10 may determine the to-be-processed instruction as the first conditional branch instruction in case that the main operation code and the function code represent that the to-be-processed instruction is a conditional branch instruction and the jump range is within the first range.

In the embodiments of the disclosure, when the first instruction detection module 10 determines the to-be-processed instruction as the first conditional branch instruction according to the jump range, the initial instruction of the jump instructions and the non-jump instruction are also determined. The non-jump instruction is an instruction within the jump range of the first conditional branch instruction, and the non-jump instruction includes instructions from the next instruction following the first conditional branch instruction to the instruction previous to the jump instructions. The initial instruction of the jump instructions is the target instruction indicated by the jump range in the instruction code.

In the embodiments of the disclosure, the first instruction flagging module 20 may set instruction flags for to-be-processed instructions to be flagged. The to-be-processed instructions to be flagged include the first conditional branch instruction and the non-jump instructions. The instruction flag of the first conditional branch instruction is a branch flag, and the instruction flag of the non-jump instruction is a non-jump flag.

Exemplarily, if the 5th instruction of the to-be-processed instructions in the current beat is the first conditional branch instruction and the jump range is 2, the non-jump instruction is the 6th to-be-processed instruction, and the initial instruction of the jump instructions is the 7th to-be-processed instruction. If the 5th instruction of the to-be-processed instructions in the current beat is the first conditional branch instruction and the jump range is 3, the non-jump instructions are the 6th to-be-processed instruction and the 7th to-be-processed instruction, and the initial instruction of the jump instructions is the 8th to-be-processed instruction.

In the embodiments of the disclosure, the instruction flags of the first conditional branch instruction and the non-jump instruction may be the same or different, which may be set as demanded and is not limited in the embodiments of the disclosure.

In some embodiments, a flag code is set for each to-be-processed instruction, the flag code has the number of flag bits. Here, the number of flag bits may be set according to actual needs, which is not limited in the embodiments of the disclosure. In some embodiments, different flag codes may represent different flags. For example, if the number of flag bits is 2, a flag code 00 is the branch flag, and a flag code 11 is the non-jump flag. In some embodiments, the number of flag bits is 1. Each instruction type of each to-be-processed instruction may have its own flag code, wherein 0 indicates that no instruction flag is set and 1 indicates that an instruction flag is set. Exemplarily, a flag code of branch flags of five to-be-processed instructions is 00010, which indicates that an instruction flag is set for the 4th to-be-processed instruction.

In some embodiments, the instruction code may further include the flag code, and the first instruction flagging module 20 may flag a non-jump instruction by setting the flag code. Exemplarily, the flag code may be 1 bit, and 1 is the non-jump flag.

It is to be noted that the setting manner of the instruction flag may be set according to actual needs, which is not limited in the embodiments of the disclosure.

In the embodiments of the disclosure, after the to-be-processed instructions are flagged by the instruction flagging circuit, when the to-be-processed instructions enter the instruction execution circuit, the instruction execution circuit may execute the instruction after the first conditional branch instruction according to the flag. When it is determined that the first conditional branch instruction jumps, the instruction without the instruction flag, i.e., the jump instruction, is executed. When it is determined that the first conditional branch instruction does not jump, the instruction with the instruction flag, i.e., the non-jump instruction, is executed.

It is to be understood that the instruction flagging circuit may detect the first conditional branch instruction of the to-be-processed instructions, and distinguish the jump instruction from the non-jump instruction by setting the instruction flag for the non-jump instruction. In this way, regardless of whether the first conditional branch instruction jumps subsequently, the correct instruction may be executed according to the instruction flag, which thereby reduces the probability that the pipeline is flushed and improves the processing efficiency of the processor.

Figure 2:
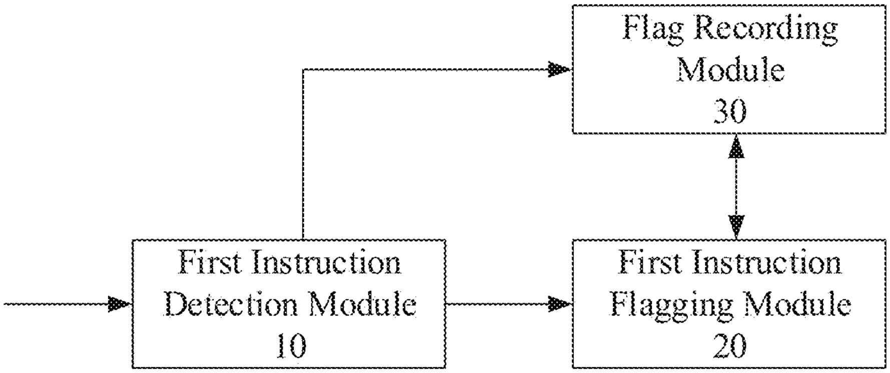
FIG. 2 is a schematic diagram of a structure of an optional instruction flagging circuit provided by an embodiment of the disclosure.

In some embodiments of the disclosure, the to-be-processed instructions includes multiple beats. The number of instructions within the first range is less than or equal to the total number of instructions in the current beat. Based on FIG. 1, FIG. 2 illustrates a structure of an instruction flagging circuit. As illustrated in FIG. 2, the instruction flagging circuit further includes a flag recording module 30. The flag recording module 30 is configured to determine, according to the number of non-jump instructions in the last instruction group and the jump range, the number of non-jump instructions in the next beat for the first conditional branch instruction, as a remaining unflagged number for the current beat, wherein an instruction group corresponds to a first conditional branch instruction; and send a remaining unflagged number for the previous beat to the first instruction flagging module. The first instruction flagging module 20 is further configured to set the instruction flags for a remaining number of foremost instructions of the to-be-processed instructions in the current beat, wherein the remaining number is the remaining unflagged number for the previous beat; set the instruction flags for a first conditional branch instruction and a corresponding non-jump instruction of the to-be-processed instructions in the current beat to obtain first flagged instructions in the current beat; and take the first flagged instructions in the current beat as target flagged instructions in the current beat.

In the embodiments of the disclosure, each beat corresponds to a clock cycle. The first instruction detection module 10 and the first instruction flagging module 20 may process a beat of to-be-processed instructions per clock cycle. In this way, the first conditional branch instruction and the corresponding non-jump instruction may be instructions in the same beat or instructions in different beats.

In the embodiments of the disclosure, the number of instructions within the first range is less than or equal to the total number of instructions in the current beat, which represents that when it is determined that the first conditional branch instruction jumps, the target instruction may be in the to-be-processed instructions in the current beat or the next beat.

Exemplarily, the first instruction detection module 10 reads 10 to-be-processed instructions in a beat, the first range is 10, and the 5th instruction of the to-be-processed instructions in the current beat is the first conditional branch instruction. If the jump range is 4, it is indicated that the first conditional branch instruction jumps to the 9th instruction in the current beat when jump occurs. If the jump range is 8, it is indicated that the first conditional branch instruction jumps to the 3rd instruction in the next beat when jump occurs.

In the embodiments of the disclosure, the to-be-processed instructions in each beat may be grouped according to the first conditional branch instruction to obtain at least one instruction group. An instruction group corresponds to a first conditional branch instruction.

Exemplarily, the to-be-processed instructions in the current beat include 10 instructions. The 1st instruction is the first conditional branch instruction, and the 2nd-3rd instructions are non-jump instructions for the 1st instruction. The 6th instruction is the first conditional branch instruction, and the 7th-9th instructions are non-jump instructions for the 6th instruction. In this way, the 1st-3rd instructions form an instruction group, and the 6th-8th instructions form an instruction group.

In the embodiments of the disclosure, if the non-jump instructions for the first conditional branch instruction of the to-be-processed instructions in the current beat further include a to-be-processed instruction in the next beat, the first conditional branch instruction generally belongs to the last instruction group in the current beat. The first instruction detection module 10 may determine the number of the non-jump instructions for the first conditional branch instruction according to the jump range of the first conditional branch instruction in the last instruction group; take the difference between the number of the non-jump instructions for the first conditional branch instruction and the number of non-jump instructions for the first conditional branch instruction in the current beat as the number of non-jump instructions for the first conditional branch instruction in the next beat, to obtain the remaining unflagged number for the current beat; and send the remaining unflagged number for the current beat to the flag recording module 30.

While receiving the remaining unflagged number for the current beat, the flag recording module 30 may send the remaining unflagged number for the previous beat to the first instruction flagging module 20. The first instruction flagging module 20 may set, according to the first detection result in the current beat, the instruction flags for the first conditional branch instruction in the current beat and the corresponding non-jump instruction in the current beat; set the instruction flags for the remaining number of foremost instructions of the to-be-processed instructions in the current beat to obtain the first flagged instructions in the current beat; and take the first flagged instructions as the target flagged instructions.

Exemplarily, the to-be-processed instructions in each beat include 10 to-be-processed instructions. The first instruction detection module 10 detects that the 5th instruction of the to-be-processed instructions in the 1st beat is the first conditional branch instruction and the jump range is 8. The non-jump instructions for the first conditional branch instruction include the 6th-10th instructions in the 1st beat, and the 1st-3rd instructions in the 2nd beat. The first instruction flagging module 20 will set instruction flags for the 5th-10th instructions of the to-be-processed instructions in the 1st beat. The flag recording module 30 acquires the remaining unflagged number 3 in the 1 st beat from the first instruction detection module 10 and saves the remaining unflagged number. Then, the first instruction detection module 10 receives the to-be-processed instructions in the 2nd beat, and determines that the 8th instruction of the to-be-processed instructions in the 2nd beat is the first conditional branch instruction and the jump range is 3. The non-jump instructions for the first conditional branch instruction include the 9th-10th instructions in the 2nd beat and the 1st instruction in the 3rd beat. In such case, the remaining unflagged number in the 2nd beat is 1. The flag recording module 30 acquires the remaining unflagged number 1 in the 2nd beat from the first instruction detection module 10 and saves the remaining unflagged number, and sends the remaining unflagged number 3 in the 1st beat to the first instruction flagging module 20. In this way, in addition to the 8th-10th instructions in the 2nd beat, the first instruction flagging module 20 further sets instruction flags for the 1st-3rd instructions in the 2nd beat, such that the first flagged instructions in the 2nd beat are obtained.

It is to be understood that the remaining unflagged number for the current beat is recorded by the flag recording module 30, and the first instruction flagging module 20 is informed of the remaining unflagged number for the current beat when the remaining unflagged number in the next beat comes. In this way, in the to-be-processed instructions in the next beat, the first instruction flagging module 20 may continue to complete setting the instruction flag for the non-jump instruction for the first conditional branch instruction in the current beat, which may improve the accuracy of the instruction flags of the target flagged instructions, and thereby improve the processing performance of the processor.

Figure 3:
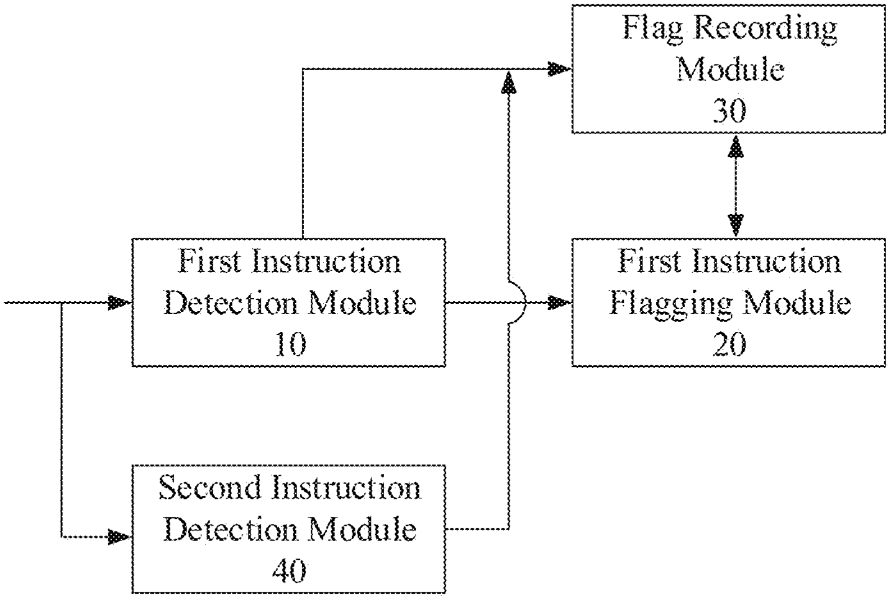
FIG. 3 is a schematic diagram of a structure of an optional instruction flagging circuit provided by an embodiment of the disclosure.

Based on FIG. 2, FIG. 3 illustrates a structure of an instruction flagging circuit. As illustrated in FIG. 3, the instruction flagging circuit further includes a second instruction detection module 40. The second instruction detection module 40 is configured to perform pointer jump detection on the to-be-processed instructions in the current beat to determine a pointer jump instruction in the current beat. The first instruction flagging module 20 is further configured to set the instruction flags for the remaining number of foremost instructions of the to-be-processed instructions in the current beat, and for instructions in an instruction group other than the last instruction group, to obtain the first flagged instructions in the current beat; and update the remaining unflagged number for the current beat to 0. The remaining unflagged number represents the number of non-jump instructions in the next beat for the last first conditional branch instruction.

In the embodiments of the disclosure, the second instruction detection module 40 may detect the pointer jump instruction according to the instruction code of the to-be-processed instructions in the current beat. The pointer jump instruction represents that the pointer of the instruction does not point to the next instruction of the instruction, and the pointer jump instruction may include a conditional branch instruction and an unconditional jump instruction. In case that a non-jump instruction is a pointer jump instruction, the non-jump instruction may not be executed normally. In such case, the non-jump instruction cannot be a to-be-executed instruction. In this way, the first instruction flagging module 20 may determine flag validity of an instruction group as invalid in case that any non-jump instruction in the instruction group is a pointer-jump instruction, or determine the flag validity of the instruction group as valid in case that all the non-jump instructions in the instruction group are not pointer-jump instructions.

In the embodiments of the disclosure, in case that the remaining unflagged number for the current beat is greater than 0, the non-jump instruction for the last first conditional branch instruction in the current beat further includes the to-be-processed instruction in the next beat. In such case, if any non-jump instruction in the last instruction group in the current beat is a pointer jump instruction, it represents that the flag validity of the last instruction group in the current beat and the first instruction group in the next beat is invalid. The first instruction flagging module 20 may further not set instruction flags for the last instruction group in the current beat and may update the remaining unflagged number for the current beat to 0. Since the first instruction group in the next beat is the non-jump instruction for the last first conditional branch instruction in the current beat, the first instruction group in the next beat will not be flagged in case that the remaining unflagged number for the current beat is updated to 0.

Exemplarily, FIG. 4 illustrates first flagged instructions in 3 consecutive beats. As illustrated in FIG. 4, the instructions in each beat include four instructions. The 1st instruction of the instructions in the 1st beat is the first conditional branch instruction Sfb, and the 2nd instruction is the non-jump instruction sfb_shadow for the 1st instruction. The 3rd instruction is the first conditional branch instruction Sfb, and the non-jump instructions sfb_shadow for the 3rd instruction are the 4th instruction in the 1st beat and the 5th-6th instructions in the 2nd beat. In such case, the remaining unflagged number for the current beat may be determined as 2. For the instructions in the 1st beat, the 1st-2nd instructions are an instruction group, and the 3rd-4th instructions are in an instruction group. A second instruction flagging module 50 may set instruction flags for the 1st-2nd instructions. In case that the 4th instruction is a pointer jump instruction, the second instruction flagging module 50 will not set instruction flags for the 3rd-4th instructions, and will update the remaining unflagged number for the current beat to 0. In this way, the second instruction flagging module 50 will also not set instruction flags for the 5th-6th instructions when processing the instructions in the 2nd beat.

It is to be understood that, since the second instruction detection module 40 may detect the pointer jump instruction, the first instruction flagging module 20 may not set instruction flags for the last instruction group in the current beat and the first instruction group in the next beat in case that the non-jump instruction for the last first conditional branch instruction in the current beat includes the to-be-processed instruction in the next beat and the non-jump instruction in the last instruction group in the current beat includes the pointer jump instruction. In this way, the accuracy of the instruction flags of the target flagged instructions may be improved.

Based on FIG. 3, FIG. 5 illustrates a structure of an instruction flagging circuit. As illustrated in FIG. 5, the instruction flagging circuit further includes a second instruction flagging module 50 and a flag deletion module 60. The second instruction flagging module 50 is configured to detect flag validity of each instruction group in the current beat according to the pointer jump instruction in the current beat and the non-jump instruction in the current beat. The flag deletion module 60 is configured to determine an invalid flagged group of the first flagged instructions in the current beat according to the flag validity of each instruction group in the current beat; delete the instruction flags of the invalid flagged group to obtain second flagged instructions in the current beat; and take the second flagged instructions in the current beat as the target flagged instructions.

In the embodiments of the disclosure, the second instruction flagging module 50 may determine the flag validity of an instruction group as invalid in case that any non-jump instruction in the instruction group is a pointer-jump instruction, or determine the flag validity of the instruction group as valid in case that all the non-jump instructions in the instruction group are not pointer-jump instructions. After determining the flag validity of each instruction group in the current beat, the second instruction flagging module 50 may send the flag validity to the flag deletion module 60. The flag deletion module 60 may determine the instruction group with invalid flag validity as the invalid flagged group according to the flag validity of the instructions in the current beat, delete the instruction flags of the invalid flagged group, and determine the obtained second flagged instructions in the current beat as the target flagged instructions.

Exemplarily, the first flagged instructions in the current beat include 10 instructions. The 2nd-6th instructions are an instruction group, the 2nd instruction is the first conditional branch instruction, and the 3rd-6th instructions are non-jump instructions for the 2nd instruction. The second instruction flagging module 50 determines the 5th instruction as a pointer operation instruction, and then the flag deletion module 60 may determine the instruction group to which the 2nd-6th instructions belong as an invalid flagged group and delete the instruction flags of the 2nd-6th instructions.

It is to be understood that since the second instruction flagging module 50 may detect the flag validity of the first flagged instructions in the current beat, the flag deletion module 60 may delete the invalid instruction flags of the first flagged instructions in the current beat to obtain the second flagged instructions in the current beat. In this way, the accuracy of the instruction flags of the second flagged instructions in the current beat may be improved.

Based on FIG. 5, FIG. 6 illustrates a structure of an instruction flagging circuit. As illustrated in FIG. 6, the instruction flagging circuit includes a first-stage circuit 01 and a second-stage circuit 02. The first-stage circuit 01 includes the first instruction detection module 10, the first instruction flagging module 20, the flag recording module 30, the second instruction detection module 40 and the second instruction flagging module 50. The second-stage circuit 02 includes the flag deletion module 60. The second instruction flagging module 50 is further configured to generate a first indicative signal for the current beat according to flag validity of each instruction in the current beat; generate a feed-forward signal for the current beat according to flag validity of each instruction in the first instruction group in the current beat, wherein the flag validity of each instruction is the same as flag validity of the instruction group to which the instruction belongs; and generate a second indicative signal for the current beat according to the remaining unflagged number for the current beat. The flag deletion module 60 is further configured to determine the invalid flagged group in the current beat according to the first indicative signal for the current beat, a feed-forward signal in the next beat and the second indicative signal for the current beat.

In the embodiments of the disclosure, the instruction flagging circuit includes two stages and may process to-be-processed instructions in two consecutive beats. Exemplarily, during a clock cycle, to-be-processed instructions in the 1st beat are in the first-stage circuit for first-stage processing. When the next clock cycle comes, the to-be-processed instructions in the 1st beat have been processed in the first-stage circuit and enter the second-stage circuit for second-stage processing. At the same time, to-be-processed instructions in the 2nd beat enter the first-stage circuit for the first-stage processing.

In the embodiments of the disclosure, the first indicative signal is configured to represent the flag validity of each instruction in the current beat, and the second indicative signal is configured to represent the remaining unflagged number for the current beat. In case that the clock cycle corresponding to the current beat completes and the clock cycle corresponding to the next beat comes, the second instruction flagging module 50 may send the first indicative signal for the current beat and the second indicative signal for the current beat together to the flag deletion module 60 of the next stage circuit. The feed-forward signal for the current beat is configured to indicate the flag validity of each instruction in the last instruction group in the current beat, which may be transmitted to the flag deletion module 60 in real time without waiting for the clock cycle.

It is to be noted that in case that the current remaining unflagged number is greater than 0, it is represented that none of the instructions in the last instruction group in the current beat is a pointer jump instruction, and the flag validity is valid. In such case, it is needed to determine whether the last instruction group in the current beat is an invalid flagged group by taking the flag validity of the first instruction group in the next beat into account.

In the embodiments of the disclosure, the flag deletion module 60 may determine actual validity of each instruction according to the first indicative signal for the current beat in case that the second indicative signal for the current beat indicates that the current remaining unflagged number is equal to 0, or determine the actual validity of each instruction according to the first indicative signal for the current beat together with the feed-forward signal for the current beat in case that the second indicative signal for the current beat indicates that the current remaining unflagged number is greater than 0. In case that the actual validity of the instruction represents the flag validity as invalid, the instruction group to which the instruction belongs is determined as an invalid flagged group.

Exemplarily, for the instructions in the 2nd beat in FIG. 4, the 5th-6th instructions are in an instruction group, and the 7th-8th instructions are in another instruction group. The 7th instruction is the first conditional branch instruction Sfb, the 8th instruction and the 9th-10th instructions in the 3rd beat are non-jump instructions sfb_shadow for the 7th instruction, and the 8th instruction is not a pointer jump instruction. The instruction validity of the last instruction group in the 2nd beat is valid. In such case, the current remaining unflagged number is 2. The second instruction flagging module 50 needs to determine the actual validity of the instruction flags of the 7th-8th instructions in the 2nd beat in combination with whether the 9th-10th instructions in the 3rd beat are pointer jump instructions. If any of the 9th-10th instructions in the 3rd beat is a pointer jump instruction, it is determined that the actual validity of both of the instruction flags of the 7th-8th instructions in the 2nd beat is invalid. If none of the 9th-10th instructions in the 3rd beat is a pointer jump instruction, the actual validity of both of the instruction flags of the 7th-8th instructions in the 2nd beat is valid.

It is to be understood that since the instruction flagging circuit includes circuits of two stages and the flag deletion module 60 is disposed in the next-stage circuit of the second instruction flagging module 50, the flag deletion module 60 may acquire the first indicative signal for the current beat, the second indicative signal for the current beat and the feed-forward signal for the next beat when processing the first flagged instructions in the current beat. In this way, the flag deletion module 60 flexibly determines the invalid flagged group, which improves the accuracy of the invalid flagged group.

In some embodiments of the disclosure, the second instruction flagging module 50 is further configured to: determine, in case that flag validity of an instruction is valid, a first indicative signal of the instruction as a first signal, and determine, in case that the flag validity of the instruction is invalid, the first indicative signal of the instruction as a second signal. The first signal and the second signal are inverse signals for each other. The second instruction flagging module 50 is further configured to: determine, in case that flag validity of the first instruction group is valid, a feed-forward signal of each instruction in the first instruction group as the first signal, and a feed-forward signal of other instruction as the second signal; or determine, in case that the flag validity of the first instruction group is invalid, a feed-forward signal of each instruction as the second signal. The second instruction flagging module 50 is further configured to: determine, in case that the remaining unflagged number for the current beat is equal to 0, a second indicative signal of each instruction in the current beat as the first signal; or determine, in case that the remaining unflagged number for the current beat is greater than 0, a second indicative signal of each instruction in the last instruction group in the current beat as the second signal, and a second indicative signal of an instruction other than the last instruction group in the current beat as the first signal.

In the embodiments of the disclosure, in case that the flag validity of an instruction is valid, both of the first indicative signal and the feed-forward signal of the instruction are the first signals. In case that the flag validity of an instruction is invalid, both of the first indicative signal and the feed-forward signal of the instruction are the second signals.

In the embodiments of the disclosure, in case that the remaining unflagged number for the current beat is equal to 0, the flag validity of each instruction group in the current beat is the actual validity of the instruction flag of each instruction group. The actual validity may be determined during the current beat, and it is not needed to determine the actual validity of the instruction flag of the last instruction group in the current beat by the flag validity of the first instruction group in the next beat. That is to say, the flag validity of each instruction in the current beat is determined, and in such case, the second indicative signal of each instruction is the first signal. In case that the remaining unflagged number for the current beat is greater than 0, the flag validity of the last instruction group in the current beat is valid, but in case that the flag validity of the first instruction group in the next beat is invalid, the actual validity of the instruction flag of the last instruction group in the current beat is invalid. In case that the flag validity of the first instruction group in the next beat is also valid, the actual validity of the instruction flag of the last instruction group in the current beat may remain valid. That is to say, in case that the remaining unflagged number for the current beat is greater than 0, the flag validity of the last instruction group in the current beat is undetermined, and the second indicative signal of each instruction in the last instruction group is the second signal.

In some embodiments, the first signal is a low level signal, and the second signal is a high level signal. In some embodiments, the first signal is a high level signal, and the second signal is a low level signal. This may be set as demanded, which is not limited in the embodiments of the disclosure.

It is to be understood that for the first indicative signal and the feed-forward signal, the signal corresponding to valid and the signal corresponding to invalid are inverse signals; and for the second indicative signal, signals corresponding to determined validity and undetermined validity are also inverse signals. In this way, it may be convenient for the flag deletion module 60 to identify the first indicative signal, the feed-forward signal and the second indicative signal, and perform a logical processing on the first indicative signal, the feed-forward signal and the second indicative signal, which improves the efficiency of the flag deletion module 60 in determining the invalid flagged group.

In some embodiments of the disclosure, the first signal is a low level signal, and the second signal is a high level signal. The flag deletion module 60 is further configured to: perform, in case that the remaining unflagged number for the current beat is equal to 0, an AND operation on the first indicative signal for the current beat and an inverse signal of the second indicative signal for the current beat to obtain a valid indicative signal for the current beat; and determine an instruction group, to which an instruction corresponding to a low level signal in the valid indicative signal belongs, as the invalid flagged group in the current beat.

In the embodiments of the disclosure, in case that the remaining unflagged number for the current beat is equal to 0, the flag validity of all the instructions in the current beat is determined, which does not need to be determined in combination with the flag validity of the first instruction group in the next beat. Therefore, the second indicative signal of each instruction is at a low level. The AND operation is performed on the first indicative signal for the current beat and the inverse signal of the second indicative signal for the current beat, and what is obtained is still the first indicative signal for the current beat. The flag deletion module 60 may determine the instruction group, to which the instruction corresponding to the low level signal in the first indicative signal for the current beat, belongs as the invalid flagged group.

Exemplarily, in FIG. 4, the instruction flags in the 1st beat are 1100, which indicates that the instruction group consisting of the 3rd-4th instructions is an invalid flagged group, and thus instruction flags are not set for the 3rd-4th instructions. Since the 3rd-4th instructions have no instruction flag, the result of deleting the instruction flags of the 3rd-4th instructions remains that the 3rd-4th instructions have no flag. In this way, the instruction flags of the target flagged instructions are still 1100.

It is to be understood that the flag deletion module 60 may perform a logical operation on the first indicative signal for the current beat and the second indicative signal for the current beat in case that the remaining unflagged number for the current beat is 0. The obtained valid indicative signal is the indicative signal in the current beat. In this way, the flag deletion module 60 may quickly achieve a function of directly taking the flag validity of the instruction flag of each instruction in the current beat as the actual validity in case that the remaining unflagged number for the current beat is 0, which improves the efficiency of determining the invalid flagged group.

In some embodiments of the disclosure, the first signal is a low level signal, and the second signal is a high level signal. The flag deletion module 60 is further configured to: perform an OR operation on the first indicative signal for the current beat and the feed-forward signal for the next beat to obtain an OR processing signal for the current beat; perform an AND operation on an inverse signal of the OR processing signal for the current beat and an inverse signal of the second indicative signal for the current beat to obtain a valid indicative signal for the current beat; and determine an instruction group, to which an instruction corresponding to a low level signal in the valid indicative signal belongs, as the invalid flagged group in the current beat.

In the embodiments of the disclosure, in case that the remaining unflagged number for the current beat is greater than 0, the flag validity of the last instruction group in the instructions in the current beat is undetermined, which needs to be determined by taking the flag validity of the first instruction group in the next beat into account. The flag validity of other instruction groups is determined. Therefore, the second indicative signal of each instruction in the last instruction group in the current beat is at a high level, and the second indicative signal of each instruction in other instruction groups is at a low level.

Exemplarily, in FIG. 4, the instruction flags in the 2nd beat are 0011. The 8th instruction in the 7th-8th instructions is not a pointer jump instruction, i.e., the flag validity of the 7th-8th instructions in the 2nd beat is valid. In such case, the first indicative signal in the 2nd beat is 0000. Since the remaining unflagged number in the 2nd beat is 2, that is, the actual validity of the instruction flags of the 7th-8th instructions is required to be determined by taking the flag validity of the 9th-10th instructions in the 3rd beat into account, the second indicative signal in the 2nd beat is 0011. In case that a pointer jump instruction is included in the 9th-10th instructions in the 3rd beat, the feed-forward signal in the 3rd beat is 1100. In this way, the flag deletion module 60 may obtain an OR processing signal of 1100, and perform an AND processing on the inverse signal of the or processing and the inverse signal of the second indicative signal to obtain a valid indicative signal of 0000. That is to say, it is needed to delete the instruction flags of the 5th-8th instructions. Therefore, none of the target flagged instructions in the 2nd beat has the instruction flag.

It is to be understood that in case that the remaining unflagged number for the current beat is greater than 0, the flag deletion module 60 may obtain the valid indicative signal by performing a logical operation on the first indicative signal for the current beat, the feed-forward signal for the current beat and the second indicative signal for the current beat. In this way, the flag deletion module 60 may quickly determine the invalid flagged group in case that the remaining unflagged number for the current beat is greater than 0.

Figure 7:
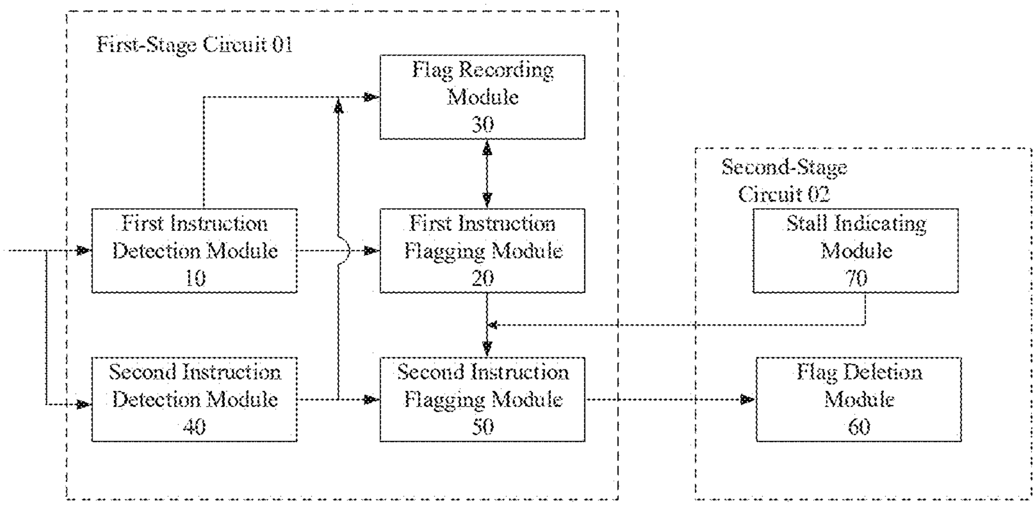
FIG. 7 is a schematic diagram of a structure of an optional instruction flagging circuit provided by an embodiment of the disclosure.

In some embodiments of the disclosure, the multiple beats include an empty beat, and the number of to-be-processed instructions in the empty beat is 0. The to-be-processed instructions in the current beat are still the to-be-processed instructions in the previous beat in case that the current beat is an empty beat. Based on FIG. 6, FIG. 7 illustrates a structure of an instruction flagging circuit. As illustrated in FIG. 7, the second-stage circuit 02 further includes a stall indicating module 70. The stall indicating module 70 is configured to feed forward a stall operation signal to the second instruction flagging module 50. The stall operation signal is configured to indicate the second instruction flagging module 50 to stall operation for a beat.

In the embodiments of the disclosure, in case that the number of to-be-processed instructions in the current beat acquired in the first-stage circuit 01 is 0, it indicates that the current beat is an empty beat. Since the first-stage circuit 01 updates data in each beat, the empty beat will cause data of each module in the first-stage circuit 01 to be updated as incorrect data. When the first-stage circuit 01 is processing the empty beat, the current beat of the stall indicating module 70 is the previous beat of the first-stage circuit 01. The stall indicating module 70 may feed forward the stall operation signal to the second instruction flagging module 50 in case that the current beat is an empty beat, such that the second instruction flagging module 50 stalls operation for a beat when processing the empty beat, and restarts operation in case that the next beat of the first-stage circuit 01 is not empty beat data. In this way, it is possible to reduce the probability of processing errors of the flag deletion module 60, which is caused by errors in the first indicative signal, the feed-forward signal and the second indicative signal sent from the second instruction flagging module 50 according to incorrect data, thereby improving the accuracy of the instruction flags of the target flagged instructions.

In some embodiments of the disclosure, the stall indicating module 70 is further configured to: acquire the remaining unflagged number for the previous beat from the flag recording module 30; and send, in case that the current beat is an empty beat, remaining flagged data in the previous beat to the second instruction flagging module. The second instruction flagging module 50 is further configured to: set the instruction flags for a remaining number of foremost instructions of to-be-processed instructions in the next beat; and take obtained third flagged instructions in the current beat as the flag completion instructions.

In the embodiments of the disclosure, in case that the remaining unflagged number for the previous beat of the second-stage circuit 02 is required to be flagged in the current beat, if the current beat is an empty beat, the remaining unflagged number for the previous beat recorded by the flag recording module 30 is still transmitted to the first instruction flagging module 20. In this way, the first instruction flagging module 20 cannot use the remaining unflagged number for the previous beat. Moreover, the remaining unflagged number for the previous beat in the flag recording module 30 will also vary due to the empty beat, which results in an error. Therefore, it is needed for the first-stage circuit 01 to transmit the remaining unflagged number for the current beat to the stall indicating module 70 in the second-stage circuit 02 when the next beat comes. In this way, when the current beat of the first-stage circuit 01 is an empty beat, the second instruction flagging module 50 may receive the stall operation signal from the stall indicating module 70, which carries the remaining unflagged number for the previous beat. In this way, when the first-stage circuit 01 is processing the to-be-processed instructions in the next beat, the second instruction flagging module 50 may flag the to-be-processed instructions in the next beat by the received remaining unflagged number, such that the flag, which the first instruction flagging module 20 failed to complete, is completed by the second instruction flagging module 50 and the third flagged instructions are obtained. The second instruction flagging module 50 takes the third flagged instructions in the current beat as the flag completion instructions in the current beat, and then sends the first indicative signal for the current beat, the feed-forward signal for the current beat and the second indicative signal for the current beat to the flag deletion module 60.

It is to be understood that the first instruction flagging module 20 may be unable to complete flag in the current beat according to the remaining unflagged number in case that the multiple beats include an empty beat. In such case, the remaining unflagged number for the previous beat is fed forward by the stall indicating module 70 to the second instruction flagging module 50, such that the second instruction flagging module 50 may continue perform flagging according to the remaining unflagged number in the next beat after the empty beat ends, which can improve the accuracy of the instruction flags of the flag completion instructions.

Figure 8:
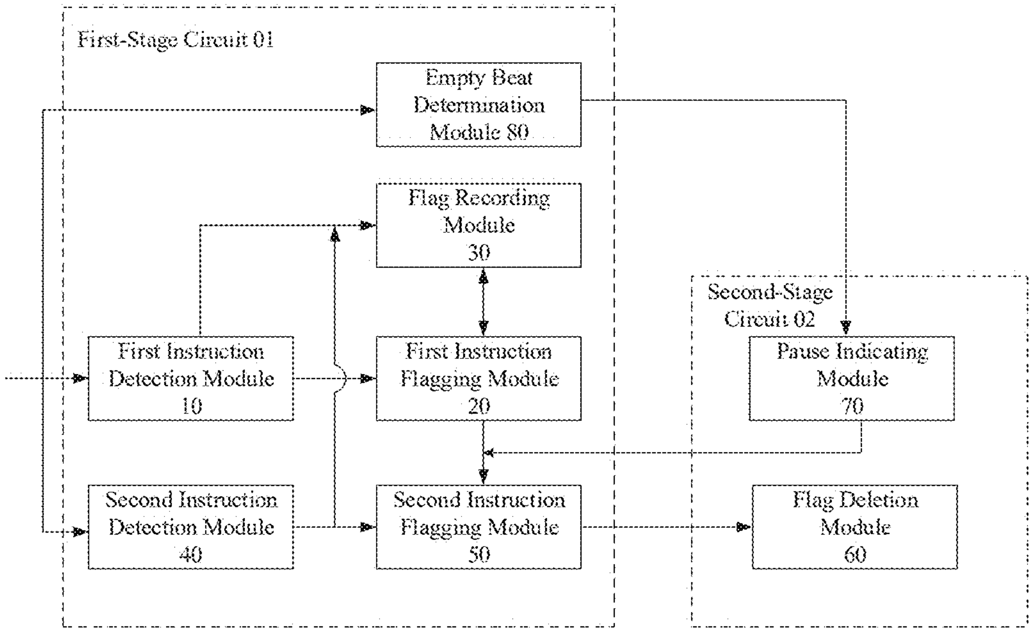
FIG. 8 is a schematic diagram of a structure of an optional instruction flagging circuit provided by an embodiment of the disclosure.

Based on FIG. 7, FIG. 8 illustrates a structure of an instruction flagging circuit. As illustrated in FIG. 8, the first-stage circuit 01 further includes an empty beat determination module 80. The empty beat determination module 80 is configured to determine whether the number of the to-be-processed instructions in the current beat is 0 to obtain an empty beat determination result. The stall indicating module 70 is further configured to send, in case that the empty beat determination result represents that the current beat is an empty beat, the remaining unflagged number for the current beat to the second instruction flagging module 50.

In the embodiments of the disclosure, the empty beat determination module 80 may determine whether the number of the to-be-processed instructions in the current beat is 0 to obtain the empty beat determination result. The empty beat determination result includes a first result and a second result. The first result is that the number of the to-be-processed instructions is 0, representing that the current beat is an empty beat. The second result is that the number of the to-be-processed instructions is greater than 0, representing that the current beat is not an empty beat.

In the embodiments of the disclosure, the empty beat determination module 80 may send the empty beat determination result to the stall indicating module 70 when the processing in the first-stage circuit 01 is completed. The stall indicating module 70 feeds forward the stall operation signal to the second instruction flagging module 50 in case that it is determined that the empty beat determination result is the first result.

It is to be understood that the empty beat determination module 80 may indicate two kinds of empty beat determination results for the current beat to the stall indicating module 70. In this way, it is possible to simplify the way in which the stall indicating module 70 determines whether the current beat is an empty beat, and to improve the efficiency of the stall indicating module 70 in determining the empty beat determination result.

Figure 9:
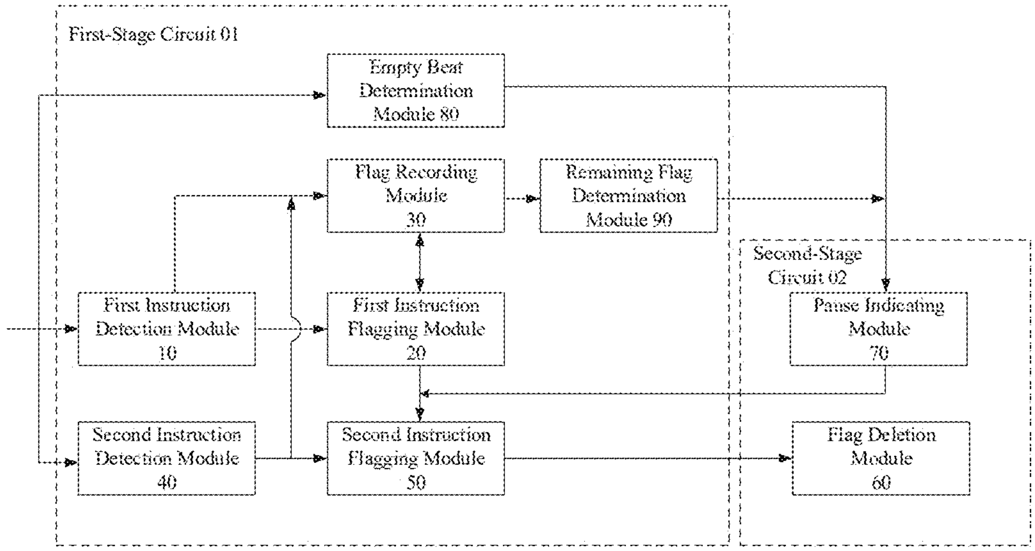
FIG. 9 is a schematic diagram of a structure of an optional instruction flagging circuit provided by an embodiment of the disclosure.

Based on FIG. 8, FIG. 9 illustrates a structure of an instruction flagging circuit. As illustrated in FIG. 9, the first-stage circuit 01 further includes a remaining flag determination module 90. The remaining flag determination module 90 is configured to acquire the remaining unflagged number for the previous beat from the flag recording module 30; and determine whether the remaining unflagged number for the previous beat is greater than 0 to obtain a remaining number determination result. The stall indicating module 70 is further configured to carry the remaining unflagged number for the previous beat in the stall operation signal in case that the remaining number determination result represents that the remaining unflagged number for the previous beat is greater than 0 and the empty beat determination result represents that the number of the to-be-processed instructions in the current beat is 0.

In the embodiments of the disclosure, the remaining flag determination module 90 may acquire the remaining unflagged number for the previous beat from the flag recording module 30, and determine whether the remaining unflagged number for the previous beat is greater than 0, to obtain the remaining number determination result. The remaining number determination result includes a third result and a fourth result. The third result is that the remaining unflagged number for the previous beat is 0, representing that it is not needed to set the instruction flag by using the remaining unflagged number for the previous beat in the current beat of the first-stage circuit 01. The fourth result is that the remaining unflagged number for the previous beat is greater than 0, representing that it is needed to set the instruction flag by using the remaining unflagged number for the previous beat in the current beat of the first-stage circuit 01.

In the embodiments of the disclosure, the remaining flag determination module 90 may send the remaining flag determination result to the stall indicating module 70 when the processing in the first-stage circuit 01 is completed. The stall indicating module 70 carries the remaining unflagged number for the previous beat in the stall operation signal in case that it is determined that the empty beat determination result is the first result and the remaining flag determination result thereof is the fourth result.

It is to be understood that the remaining flag determination module 90 may instructs two kinds of remaining flag determination results in the current beat to the stall indicating module 70. In this way, it is possible to simplify the way in which the stall indicating module 70 determines whether to send the remaining unflagged number for the previous beat to the second instruction flagging module 50, so as to improve the processing efficiency of the stall indicating module 70.

Figure 10:
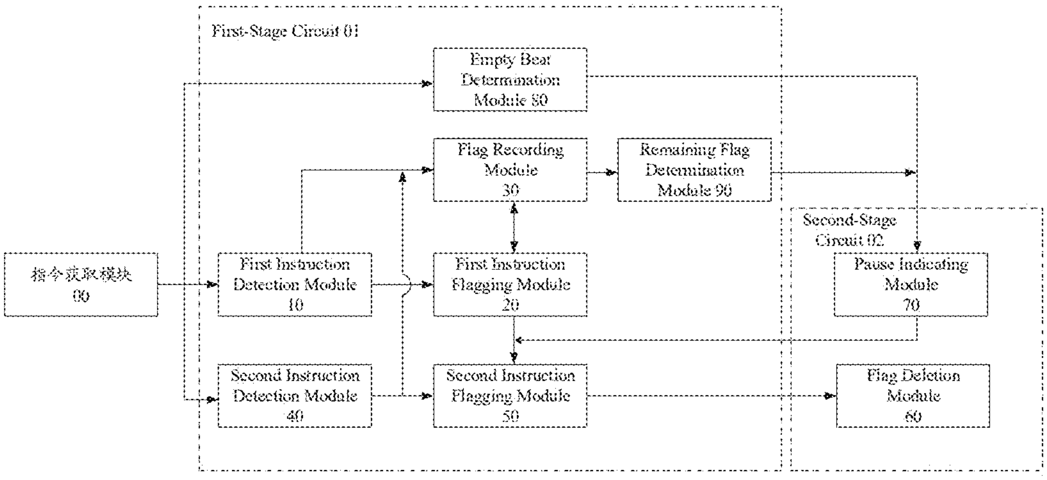
FIG. 10 is a schematic diagram of a structure of an optional instruction flagging circuit provided by an embodiment of the disclosure.

Based on FIG. 9, FIG. 10 illustrates a structure of an instruction flagging circuit. As illustrated in FIG. 10, the instruction flagging circuit may further include an instruction acquisition module 00. The instruction acquisition module 00 is configured to acquire the to-be-processed instructions in the current beat from an instruction register; and acquire the to-be-processed instructions in the next beat from the instruction register, in case that the to-be-processed instructions in the current beat have been sent to the first instruction flagging module.

In the embodiments of the disclosure, the instruction flagging circuit includes three stages, and the instruction acquisition module 00 may serve as the previous stage of the first-stage circuit 01. In this way, the instruction acquisition module 00 may acquire instructions in a beat from the instruction register in each clock cycle, and send the acquired instructions in the beat to the first-stage circuit 01 when the next clock cycle comes. At the same time, the instruction acquisition module 00 acquires instructions in the next beat from the instruction register.

In the embodiments of the disclosure, the instruction acquisition module 00 may send the to-be-processed instructions in the current beat to the first-stage circuit 01 in case that the number of the to-be-processed instructions in the current beat is equal to a preset number. In this way, the number of to-be-processed instructions in each beat may be the same, and it is convenient for the instruction flagging circuit including the first instruction flagging module 20 and second instruction flagging module 50 to set instruction flags for the to-be-processed instructions in each beat.

Figure 11:
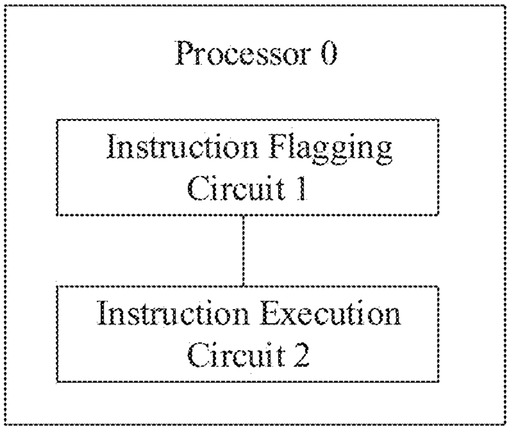
FIG. 11 is a schematic diagram of a structure of an optional processor provided by an embodiment of the disclosure.

Based on the aforementioned embodiments, an embodiment of the disclosure further provides a processor 0. As illustrated in FIG. 11, the processor 0 includes the aforementioned instruction flagging circuit 1 and an instruction execution circuit 2. The instruction flagging circuit 1 is configured to set the instruction flags for the first conditional branch instruction and non-jump instruction of the to-be-processed instructions to obtain the target flagged instructions. The instruction execution circuit 2 is configured to execute the target flagged instructions according to a jump situation of the first conditional branch instruction and the instruction flags of the target flagged instructions.

Figure 12:
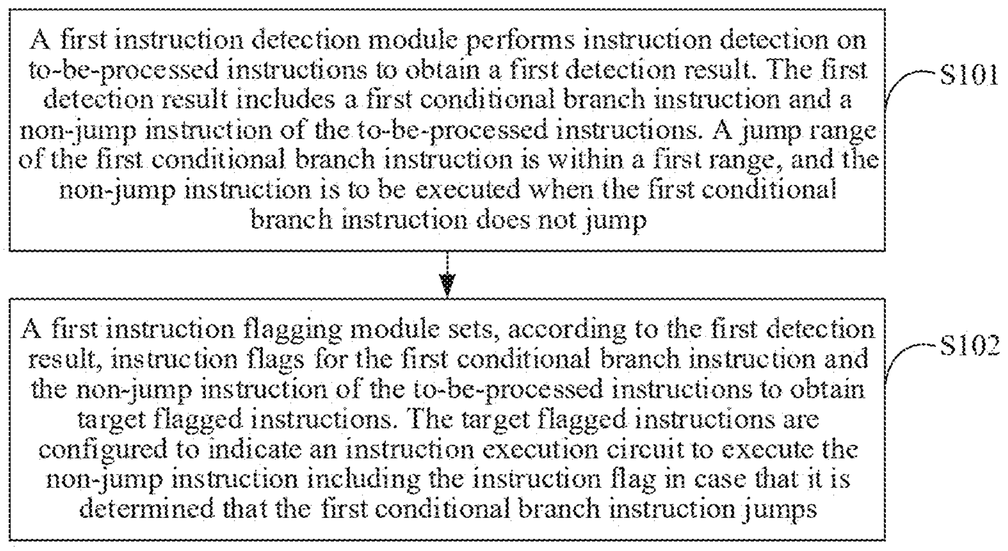
FIG. 12 is a schematic diagram of a procedure of an optional instruction flagging method provided by an embodiment of the disclosure.

Based on the aforementioned instruction flagging circuit, an embodiment of the disclosure further provides an instruction flagging method applied to the instruction flagging circuit. As illustrated in FIG. 12, the method includes operations S101-S102.

In operation S101, a first instruction detection module performs instruction detection on the to-be-processed instructions to obtain a first detection result. The first detection result includes a first conditional branch instruction and non-jump instruction(s) of the to-be-processed instructions. A jump range of the first conditional branch instruction is within a first range, and the non-jump instruction is to be executed when the first conditional branch instruction does not jump.

In operation S102, a first instruction flagging module sets, according to the first detection result, instruction flags for the first conditional branch instruction and the non-jump instruction of the to-be-processed instructions to obtain target flagged instructions. The target flagged instructions are configured to indicate an instruction execution circuit to execute the non-jump instruction including the instruction flag in case that it is determined that the first conditional branch instruction jumps.

In some embodiments, the to-be-processed instruction includes multiple beats, and the number of instructions within the first range is less than or equal to the total number of instructions in a current beat. The method further includes the following operations. A flag recording module determines, according to the number of non-jump instructions in a last instruction group in the current beat and a jump range of the last first conditional branch instruction in the current beat, the number of non-jump instructions in the next beat for the first conditional branch instruction, as a remaining unflagged number for the current beat. An instruction group corresponds to a first conditional branch instruction. The first instruction flagging module sets the instruction flags for a remaining number of foremost instructions of to-be-processed instructions in the current beat, wherein the remaining number is a remaining unflagged number for the previous beat; sets the instruction flags for a first conditional branch instruction and a corresponding non-jump instruction of the to-be-processed instructions in the current beat to obtain first flagged instructions in the current beat; and takes the first flagged instructions in the current beat as target flagged instructions in the current beat.

In some embodiments, the method further includes the following operations. A second instruction detection module performs pointer jump detection on the to-be-processed instructions in the current beat to determine a pointer jump instruction in the current beat; detects, according to the pointer jump instruction, flag validity of the last instruction group in the current beat in case that the remaining unflagged number for the current beat is greater than 0. The first instruction flagging module sets, in case that the flag validity of the last instruction group in the current beat is invalid, the instruction flags for the remaining number of foremost instructions of the to-be-processed instructions in the current beat, and for instructions in an instruction group other than the last instruction group, to obtain the first flagged instructions in the current beat; and updates the remaining unflagged number for the current beat to 0. The remaining unflagged number represents the number of non-jump instructions in the next beat for the last first conditional branch instruction.

In some embodiments, the method further includes the following operations. A second instruction flagging module takes the first flagged instructions in the current beat as flag completion instructions in the current beat; and detects flag validity of each instruction group in the current beat according to a pointer jump instruction in the current beat and a non-jump instruction of the flag completion instructions in the current beat. A flag deletion module determines an invalid flagged group of the first flagged instructions in the current beat according to the flag validity of each instruction group in the current beat; deletes the instruction flags of the invalid flagged group to obtain second flagged instructions in the current beat; and takes the second flagged instructions in the current beat as the target flagged instructions.

In some embodiments, the circuit includes a first-stage circuit and a second-stage circuit. The first-stage circuit includes the first instruction detection module, the first instruction flagging module and the second instruction flagging module. The second-stage circuit includes the flag deletion module. The method further includes the following operations. The second instruction flagging module generates a first indicative signal for the current beat according to flag validity of each instruction in the current beat; generates a feed-forward signal for the current beat according to flag validity of each instruction in the first instruction group in the current beat, wherein the flag validity of each instruction is the same as flag validity of the instruction group to which the instruction belongs; and generates a second indicative signal for the current beat according to the remaining unflagged number for the current beat. The flag deletion module determines an invalid flagged group in the current beat according to the first indicative signal for the current beat, a feed-forward signal in the next beat and the second indicative signal for the current beat.

In some embodiments, the method further includes the following operations. The second instruction flagging module determines, in case that flag validity of an instruction is valid, a first indicative signal of the instruction as a first signal, and determines, in case that the flag validity of the instruction is invalid, the first indicative signal of the instruction as a second signal. The first signal and the second signal are inverse signals for each other. The second instruction flagging module determines, in case that flag validity of the first instruction group is valid, a feed-forward signal of each instruction in the first instruction group as the first signal, and a feed-forward signal of other instruction as the second signal; or determines, in case that the flag validity of the first instruction group is invalid, a feed-forward signal of each instruction as the second signal. The second instruction flagging module determines, in case that the remaining unflagged number for the current beat is equal to 0, a second indicative signal of each instruction in the current beat as the first signal; or determines, in case that the remaining unflagged number for the current beat is greater than 0, a second indicative signal of each instruction in the last instruction group in the current beat as the second signal, and a second indicative signal of an instruction other than the last instruction group in the current beat as the first signal.

In some embodiments, the first signal is a low level signal, and the second signal is a high level signal. The method further includes the following operations. The flag deletion module performs, in case that the remaining unflagged number for the current beat is equal to 0, an AND operation on the first indicative signal for the current beat and an inverse signal of the second indicative signal for the current beat to obtain a valid indicative signal for the current beat; and determines an instruction group, to which an instruction corresponding to a low level signal in the valid indicative signal belongs, as the invalid flagged group in the current beat.

In some embodiments, the first signal is a low level signal, and the second signal is a high level signal. The method further includes the following operations. The flag deletion module performs an OR operation on the first indicative signal for the current beat and the feed-forward signal for the next beat to obtain an OR processing signal for the current beat; performs an AND operation on an inverse signal of the OR processing signal for the current beat and the inverse signal of the second indicative signal for the current beat to obtain the valid indicative signal for the current beat; and determines an instruction group to which an instruction, which corresponds to the low level signal in the valid indicative signal, belongs as the invalid flagged group in the current beat.

In some embodiments, the multiple beats include an empty beat, and the number of to-be-processed instructions in the empty beat is 0. The to-be-processed instructions in the current beat are still the to-be-processed instructions in the previous beat in case that the current beat is the empty beat. The second-stage circuit further includes a stall indicating module. The method further includes the following operations. The stall indicating module feeds forward a stall operation signal to the second instruction flagging module. The stall operation signal is configured to indicate the second instruction flagging module to stall operation for a beat.

In some embodiments, the method further includes the following operations. The stall indicating module acquires the remaining unflagged number for the previous beat from the flag recording module; and carries, in case that the previous beat is the empty beat, the remaining unflagged number for the previous beat in the stall operation signal. The second instruction flagging module sets the instruction flags for a remaining number of foremost instructions of to-be-processed instructions in the next beat; and takes obtained third flagged instructions in the current beat as the flag completion instructions.

In some embodiments, the first-stage circuit further includes an empty beat determination module. The method further includes the following operations. The empty beat determination module determines whether the number of the to-be-processed instructions in the current beat is 0 to obtain an empty beat determination result. The stall indicating module feeds forward, in case that the empty beat determination result represents that the current beat is the empty beat, the stall operation signal to the second flag recording module.

In some embodiments, the first-stage circuit further includes a remaining flag determination module. The method further includes the following operations. The remaining flag determination module acquires the remaining unflagged number for the previous beat from the flag recording module; and determines whether the remaining unflagged number for the previous beat is greater than 0 to obtain a remaining number determination result. The stall indicating module carries the remaining unflagged number for the previous beat in the stall operation signal in case that the remaining number determination result represents that the remaining unflagged number for the previous beat is greater than 0 and the empty beat determination result represents that the number of the to-be-processed instructions in the current beat is 0.

It is to be noted that illustration of the aforementioned instruction flagging method may be referred to the description of the instruction flagging circuit, which will not be repeated herein.

It is to be noted here that the above description of the various embodiments tends to emphasize the differences between the various embodiments, and their similarities or likenesses may be cross-referenced. The above description of the processor embodiments is similar to the above description of the circuit embodiments, and the processor embodiments have similar beneficial effects as the circuit embodiments. For technical details not disclosed in the processor of the disclosure, please refer to the description of the circuit embodiments of the disclosure for understanding.

It is to be understood that "an embodiment" or "one embodiment" throughout the specification indicates that a particular feature, structure or characteristic associated with the embodiment is included in at least one embodiment of the disclosure. Therefore, "in an embodiment" or "in one embodiment" appearing throughout the specification does not necessarily refer to the same embodiment. In addition, these particular features, structures or characteristics may be combined in one or more embodiments in any suitable manner. It is to be understood that in the various embodiments of the disclosure, the serial numbers of the aforementioned operations/processes do not imply an order of execution. The order of execution of the operations/processes should be determined by their functions and inherent logic, and should not constitute any limitation on the implementation processes of the embodiments of the disclosure. The aforementioned serial numbers of the embodiments of the disclosure are only for the purpose of description and do not represent advantages or disadvantages of the embodiments.

It is to be noted that in the disclosure, the terms "include", "contain", or any other variation thereof are intended to encompass a non-exclusive inclusion such that a process, method, article, or apparatus including a series of elements includes not only those elements but also other elements not explicitly listed, or elements inherent to such process, method, article, or apparatus. Without further limitation, an element limited by the statement "including a . . . " does not preclude the existence of additional identical elements in a process, method, article, or apparatus that includes the element.

In several embodiments provided by the disclosure, the circuit embodiments described above are only schematic. For example, division of the modules is only a kind of logic function division, and other division manners may be adopted in a practical implementation. For example, multiple modules or components may be combined or integrated into another system, or some features may be neglected or not executed. In addition, coupling or direct coupling or communication connection between various displayed or discussed components may be indirect coupling or communication connection through some interfaces, devices or units, and may be electrical, mechanical, or in other forms.

The above modules illustrated as separate components may or may not be physically separated, which may be located in the same place, or may also be distributed to multiple network units. Part or all of the units may be selected according to a practical requirement to implement the purpose of the solutions of the embodiments.

In addition, various function modules in various embodiments of the disclosure may be integrated into a processing unit, or each unit may serve as a unit independently, or two or more than two units may be integrated into a unit. The aforementioned integrated unit may be implemented in the form of hardware such as sub-circuit, microprocessor, sub-processor, or may be implemented in the form of hardware such as sub-circuit, microprocessor, sub-processor and software function units.

The above are only implementations of the disclosure, but the scope of protection of the disclosure is not limited thereto. Any variations or replacements apparent to those skilled in the art within the technical scope disclosed by the disclosure shall fall within the scope of protection of the disclosure.

The invention claimed is:

1. An instruction flagging circuit, comprising:

a first instruction detection sub-circuit, configured to perform instruction detection on to-be-processed instructions to obtain a first detection result, wherein the first detection result comprises: a conditional branch instruction and at least one non-jump instruction of the to-be-processed instructions, wherein a jump range of the conditional branch instruction is within a first range, and the at least one non-jump instruction is to be executed when the conditional branch instruction does not jump; and a first instruction flagging sub-circuit, configured to set, according to the first detection result, instruction flags for the conditional branch instruction and the at least one non-jump instruction of the to-be-processed instructions to obtain target flagged instructions, wherein the target flagged instructions are configured to indicate an instruction execution circuit to: execute the at least one non-jump instruction comprising the instruction flag in case that it is determined that the conditional branch instruction jumps.

2. The instruction flagging circuit of claim 1, wherein the to-be-processed instructions comprise a plurality of beats, and a number of instructions within the first range is less than or equal to a total number of instructions in a current beat; and the instruction flagging circuit further comprises:

a flag recording sub-circuit, configured to: determine, according to a number of non-jump instructions in a last instruction group in the current beat and a jump range of a last conditional branch instruction in the current beat, a number of non-jump instructions in a next beat for the last conditional branch instruction, as a remaining unflagged number for the current beat, wherein an instruction group corresponds to a conditional branch instruction; and send a remaining unflagged number in a previous beat to the first instruction flagging sub-circuit;

wherein the first instruction flagging sub-circuit is configured to: set the instruction flags for a remaining number of foremost instructions of to-be-processed instructions in the current beat, wherein the remaining number is the remaining unflagged number for the previous beat; set the instruction flags for a conditional branch instruction and at least one corresponding non-jump instruction of the to-be-processed instructions in the current beat to obtain first flagged instructions in the current beat; and take the first flagged instructions in the current beat as target flagged instructions in the current beat.

3. The instruction flagging circuit of claim 1, further comprising:

a second instruction detection sub-circuit, configured to perform pointer jump detection on to-be-processed instructions in a current beat to determine a pointer jump instruction in the current beat, wherein the first instruction flagging sub-circuit is further configured to:

detect, according to the pointer jump instruction, flag validity of a last instruction group in the current beat in case that a remaining unflagged number for the current beat is greater than 0; set, in case that the flag validity of the last instruction group in the current beat is invalid, the instruction flags for a remaining number of foremost instructions of the to-be-processed instructions in the current beat, and for instructions in an instruction group other than the last instruction group, to obtain first flagged instructions in the current beat; and update the remaining unflagged number for the current beat to 0; wherein the remaining unflagged number represents a number of non-jump instructions in a next beat for a last conditional branch instruction.

4. The instruction flagging circuit of claim 1, further comprising:

a second instruction flagging sub-circuit, configured to: take the first flagged instructions in a current beat as flag completion instructions in the current beat; and detect flag validity of each instruction group in the current beat according to a pointer jump instruction in the current beat and the at least one non-jump instruction of the flag completion instructions in the current beat; and a flag deletion sub-circuit, configured to: determine an invalid flagged group of the first flagged instructions in the current beat according to the flag validity of each instruction group in the current beat; delete the instruction flags of the invalid flagged group to obtain second flagged instructions in the current beat; and take the second flagged instructions in the current beat as the target flagged instructions.

5. The instruction flagging circuit of claim 4, comprising a first-stage circuit and a second-stage circuit, wherein the first-stage circuit comprises the first instruction detection sub-circuit, the first instruction flagging sub-circuit and the second instruction flagging sub-circuit; and the second-stage circuit comprises the flag deletion sub-circuit;

wherein the second instruction flagging sub-circuit is further configured to: generate a first indicative signal for the current beat according to flag validity of each instruction in the current beat; generate a feed-forward signal for the current beat according to flag validity of each instruction in a first instruction group in the current beat, wherein the flag validity of each instruction is same as flag validity of an instruction group to which the instruction belongs; and generate a second indicative signal for the current beat according to a remaining unflagged number for the current beat; and the flag deletion sub-circuit is further configured to: determine an invalid flagged group in the current beat according to the first indicative signal for the current beat, a feed-forward signal for a next beat and the second indicative signal for the current beat.

6. The instruction flagging circuit of claim 5, wherein the second instruction flagging sub-circuit is further configured to:

determine, in case that the flag validity of the instruction is valid, the first indicative signal of the instruction as a first signal, and determine, in case that the flag validity of the instruction is invalid, the first indicative signal of the instruction as a second signal, wherein the first signal and the second signal are inverse signals for each other;

determine, in case that flag validity of the first instruction group is valid, a feed-forward signal of each instruction in the first instruction group as the first signal, and a feed-forward signal of other instruction as the second signal; or determine, in case that the flag validity of the first instruction group is invalid, a feed-forward signal of each instruction as the second signal; and determine, in case that the remaining unflagged number for the current beat is equal to 0, a second indicative signal of each instruction in the current beat as the first signal; or determine, in case that the remaining unflagged number for the current beat is greater than 0, a second indicative signal of each instruction in a last instruction group in the current beat as the second signal, and determine a second indicative signal of an instruction other than the last instruction group in the current beat as the first signal.

7. The instruction flagging circuit of claim 6, wherein the first signal is a low level signal, and the second signal is a high level signal; and wherein the flag deletion sub-circuit is further configured to: perform, in case that the remaining unflagged number for the current beat is equal to 0, an AND operation on the first indicative signal for the current beat and an inverse signal of the second indicative signal for the current beat to obtain a valid indicative signal for the current beat; and determine an instruction group, to which an instruction corresponding to a low level signal in the valid indicative signal belongs, as the invalid flagged group in the current beat.

8. The instruction flagging circuit of claim 6, wherein the first signal is a low level signal, and the second signal is a high level signal; and wherein the flag deletion sub-circuit is further configured to: perform an OR operation on the first indicative signal for the current beat and the feed-forward signal for the next beat to obtain an OR processing signal for the current beat; perform an AND operation on an inverse signal of the OR processing signal for the current beat and an inverse signal of the second indicative signal for the current beat to obtain a valid indicative signal for the current beat; and determine an instruction group, to which an instruction corresponding to a low level signal in the valid indicative signal belongs, as the invalid flagged group in the current beat.

9. The instruction flagging circuit of claim 5, wherein a plurality of beats comprise an empty beat; a number of to-be-processed instructions in the empty beat is 0; to-be-processed instructions in the current beat are still to-be-processed instructions in a previous beat in case that the current beat is the empty beat; and the second-stage circuit further comprises:

a stall indicating sub-circuit, configured to feed forward a stall operation signal to the second instruction flagging sub-circuit, wherein the stall operation signal is configured to indicate the second instruction flagging sub-circuit to stall operation for a beat.

10. The instruction flagging circuit of claim 9, wherein the stall indicating sub-circuit is further configured to: acquire a remaining unflagged number for the previous beat from a flag recording sub-circuit; and carry, in case that the previous beat is the empty beat, the remaining unflagged number for the previous beat in the stall operation signal; and the second instruction flagging sub-circuit is further configured to: set the instruction flags for a remaining number of foremost instructions of to-be-processed instructions in the next beat; and take obtained third flagged instructions in the current beat as the flag completion instructions.

11. The instruction flagging circuit of claim 9, wherein the first-stage circuit further comprises:

an empty beat determination sub-circuit, configured to determine whether a number of the to-be-processed instructions in the current beat is 0 to obtain an empty beat determination result, wherein the stall indicating sub-circuit is further configured to feed forward, in case that the empty beat determination result represents that the current beat is the empty beat, the stall operation signal to the second instruction flagging sub-circuit.

12. The instruction flagging circuit of claim 11, wherein the first-stage circuit further comprises:

a remaining flag determination sub-circuit, configured to: acquire a remaining unflagged number for the previous beat from a flag recording sub-circuit; and determine whether the remaining unflagged number for the previous beat is greater than 0 to obtain a remaining number determination result, wherein the stall indicating sub-circuit is further configured to carry the remaining unflagged number for the previous beat in the stall operation signal in case that the remaining number determination result represents that the remaining unflagged number for the previous beat is greater than 0 and the empty beat determination result represents that the number of the to-be-processed instructions in the current beat is 0.

13. The instruction flagging circuit of claim 1, further comprising:

an instruction acquisition sub-circuit, configured to: acquire the to-be-processed instructions in a current beat from an instruction register; and acquire, in case that the to-be-processed instructions in the current beat are sent to the first instruction flagging sub-circuit, the to-be-processed instructions in a next beat from the instruction register.

14. A processor, comprising:

an instruction flagging circuit and an instruction execution circuit, wherein the instruction flagging circuit comprises:

a first instruction detection sub-circuit, configured to perform instruction detection on to-be-processed instructions to obtain a first detection result, wherein the first detection result comprises: a conditional branch instruction and at least one non-jump instruction of the to-be-processed instructions, wherein a jump range of the conditional branch instruction is within a first range, and the at least one non-jump instruction is to be executed when the conditional branch instruction does not jump; and a first instruction flagging sub-circuit, configured to set, according to the first detection result, instruction flags for the conditional branch instruction and the at least one non-jump instruction of the to-be-processed instructions to obtain target flagged instructions, wherein the target flagged instructions are configured to indicate an instruction execution circuit to:

execute the at least one non-jump instruction comprising the instruction flag in case that it is determined that the conditional branch instruction jumps, the instruction flagging circuit is configured to set the instruction flags for the conditional branch instruction and the at least one non-jump instruction of the to-be-processed instructions to obtain the target flagged instructions; and the instruction execution circuit is configured to execute the target flagged instructions according to a jump situation of the conditional branch instruction and the instruction flags of the target flagged instructions.

15. The processor of claim 14, wherein the to-be-processed instructions comprise a plurality of beats, and a number of instructions within the first range is less than or equal to a total number of instructions in a current beat; and the instruction flagging circuit further comprises:

a flag recording sub-circuit, configured to: determine, according to a number of non-jump instructions in a last instruction group in the current beat and a jump range of a last conditional branch instruction in the current beat, a number of non-jump instructions in a next beat for the last conditional branch instruction, as a remaining unflagged number for the current beat, wherein an instruction group corresponds to a conditional branch instruction; and send a remaining unflagged number in a previous beat to the first instruction flagging sub-circuit;

wherein the first instruction flagging sub-circuit is configured to: set the instruction flags for a remaining number of foremost instructions of to-be-processed instructions in the current beat, wherein the remaining number is the remaining unflagged number for the previous beat; set the instruction flags for a conditional branch instruction and at least one corresponding non-jump instruction of the to-be-processed instructions in the current beat to obtain first flagged instructions in the current beat; and take the first flagged instructions in the current beat as target flagged instructions in the current beat.

16. The processor of claim 14, further comprising:

a second instruction detection sub-circuit, configured to perform pointer jump detection on to-be-processed instructions in a current beat to determine a pointer jump instruction in the current beat, wherein the first instruction flagging sub-circuit is further configured to: detect, according to the pointer jump instruction, flag validity of a last instruction group in the current beat in case that a remaining unflagged number for the current beat is greater than 0; set, in case that the flag validity of the last instruction group in the current beat is invalid, the instruction flags for a remaining number of foremost instructions of the to-be-processed instructions in the current beat, and for instructions in an instruction group other than the last instruction group, to obtain first flagged instructions in the current beat; and update the remaining unflagged number for the current beat to 0; wherein the remaining unflagged number represents a number of non-jump instructions in a next beat for a last conditional branch instruction.

17. The processor of claim 14, further comprising:

a second instruction flagging sub-circuit, configured to: take the first flagged instructions in a current beat as flag completion instructions in the current beat; and detect flag validity of each instruction group in the current beat according to a pointer jump instruction in the current beat and the at least one non-jump instruction of the flag completion instructions in the current beat; and a flag deletion sub-circuit, configured to: determine an invalid flagged group of the first flagged instructions in the current beat according to the flag validity of each instruction group in the current beat; delete the instruction flags of the invalid flagged group to obtain second flagged instructions in the current beat; and take the second flagged instructions in the current beat as the target flagged instructions.

18. The processor of claim 17, comprising a first-stage circuit and a second-stage circuit, wherein the first-stage circuit comprises the first instruction detection sub-circuit, the first instruction flagging sub-circuit and the second instruction flagging sub-circuit; and the second-stage circuit comprises the flag deletion sub-circuit;

wherein the second instruction flagging sub-circuit is further configured to: generate a first indicative signal for the current beat according to flag validity of each instruction in the current beat; generate a feed-forward signal for the current beat according to flag validity of each instruction in a first instruction group in the current beat, wherein the flag validity of each instruction is same as flag validity of an instruction group to which the instruction belongs; and generate a second indicative signal for the current beat according to a remaining unflagged number for the current beat; and the flag deletion sub-circuit is further configured to: determine an invalid flagged group in the current beat according to the first indicative signal for the current beat, a feed-forward signal for a next beat and the second indicative signal for the current beat.

19. The processor of claim 18, wherein the second instruction flagging sub-circuit is further configured to: determine, in case that the flag validity of the instruction is valid, the first indicative signal of the instruction as a first signal, and determine, in case that the flag validity of the instruction is invalid, the first indicative signal of the instruction as a second signal, wherein the first signal and the second signal are inverse signals for each other;

determine, in case that flag validity of the first instruction group is valid, a feed-forward signal of each instruction in the first instruction group as the first signal, and a feed-forward signal of other instruction as the second signal; or determine, in case that the flag validity of the first instruction group is invalid, a feed-forward signal of each instruction as the second signal; and determine, in case that the remaining unflagged number for the current beat is equal to 0, a second indicative signal of each instruction in the current beat as the first signal; or determine, in case that the remaining unflagged number for the current beat is greater than 0, a second indicative signal of each instruction in a last instruction group in the current beat as the second signal, and determine a second indicative signal of an instruction other than the last instruction group in the current beat as the first signal.

20. An instruction flagging method, comprising:

performing, by a first instruction detection sub-circuit, instruction detection on to-be-processed instructions to obtain a first detection result, wherein the first detection result comprises: a conditional branch instruction and at least one non-jump instruction of the to-be-processed instructions, wherein a jump range of the conditional branch instruction is within a first range, and the at least one non-jump instruction is to be executed when the conditional branch instruction does not jump; and setting, by a first instruction flagging sub-circuit, according to the first detection result, instruction flags for the conditional branch instruction and the at least one non-jump instruction of the to-be-processed instructions to obtain target flagged instructions, wherein the target flagged instructions are configured to indicate an instruction execution circuit to: execute the at least one non-jump instruction comprising the instruction flag in case that it is determined that the conditional branch instruction jumps.

* * * * *